(12) United States Patent
Raj et al.

(10) Patent No.: US 9,933,767 B2
(45) Date of Patent: Apr. 3, 2018

(54) DYNAMIC STATE INTERFACE ENGINE

(71) Applicant: Invensys Systems, Inc., Foxboro, MA (US)

(72) Inventors: Iju V. Raj, Karnataka (IN); Dirk K. Kozian, Wassenberg (DE); Thomas A. Troy, Lansdale, PA (US); Prasanth Ittiera Eapen K, Karnataka (IN); Elizabeth Geojy, Karnataka (IN); Ajay Kumar Reddy Kopperla, Karnataka (IN); Arvind Kamath, Karnataka (IN)

(73) Assignee: Schneider Electric Software, LLC, Lake Forest, CA (US)

( * ) Notice: Subject to any disclaimer, the term of this patent is extended or adjusted under 35 U.S.C. 154(b) by 309 days.

(21) Appl. No.: 14/811,969

(22) Filed: Jul. 29, 2015

(65) Prior Publication Data

US 2017/0031353 A1   Feb. 2, 2017

(51) Int. Cl.
*G06F 19/00* (2011.01)
*G05B 17/02* (2006.01)

(52) U.S. Cl.
CPC .... *G05B 17/02* (2013.01); *G05B 2219/32017* (2013.01)

(58) Field of Classification Search
CPC .............. G05B 17/02; G05B 19/41885; G05B 2219/32017; G05B 2219/35441
See application file for complete search history.

(56) References Cited

U.S. PATENT DOCUMENTS

| | | | |
|---|---|---|---|
| 9,032,231 B1 * | 5/2015 | Crisp ................ | H04W 52/0293 713/323 |
| 2016/0061003 A1 * | 3/2016 | Gottumukkala ........ | E21B 34/16 166/250.07 |
| 2016/0179081 A1 * | 6/2016 | Sun ..................... | G05B 19/4069 700/97 |
| 2017/0031354 A1 * | 2/2017 | Tyber ............... | G05B 19/41885 |

* cited by examiner

*Primary Examiner* — Mark Connolly
(74) *Attorney, Agent, or Firm* — Stephen Manetta; Susmita Shandari

(57) ABSTRACT

Systems and methods for providing a dynamically synchronized instance to a network device. A repository database stores a process model instance having a layout defined by data elements. A design tool processor coupled to the repository database provides the instance to a user device and a network device. The user device modifies data elements of the instance to generate a first version instance, and the design tool processor generates a dynamically synchronized instance for storing and serving the dynamically synchronized instance to a network device.

20 Claims, 4 Drawing Sheets

DYNAMIC STATE INTERFACE ENGINE

BACKGROUND

Determining the sequence of operation, as well as the operating parameters, of production line devices that are automated to execute a planned project is typically assisted by production line modeling software. This software allows users to define variables that control the sequence and the parameters that must be documented and managed to adequately execute the project using devices operating in the production line. Software platforms also provide tools that allow for data relevant to the production line, such as tasks related to devices operating on the production line, to be presented to users.

Current model-driven software platforms provide limited capability of adapting data relevant to the production line. For example, software tools allow for production line operators to raise issues related to the production line that then may be acted upon by decision making entities, such as the operator's supervisor or a manager tasked with meeting other objectives related to the execution of the planned project. Although current software platforms provide a user interface (UI) with rendered data related to production line device management to facilitate communications among these personnel, the software tools that provide and display the data are currently adaptable in only limited ways by customers to meet their specific needs. Such platforms do not account for various considerations that would optimize the collective input of various personnel on data related to production line device management.

SUMMARY

Briefly, aspects of the present invention relate to systems and methods for serving a dynamically synchronized version of a process model instance (or "dynamically synchronized instance"), the dynamically synchronized instance providing updatable production line-related data to users. Advantageously, aspects of the invention provide for adapting the data according to the device providing the UI to the user. This advantage is particularly relevant given the increased emphasis on mobile devices. Also, while current tools limit adaptation of the data according to boundaries within the enterprise and the software may be particularly suited to devices or other production line components within one enterprise, in an aspect the invention functions as efficiently within another enterprise and facilitates the upgrade or replacement of components. And, even though current tools may display device management related data to users, and allow users to provide limited input, aspects of the invention allow for the data to be continuously updated to reflect the current state of the relevant aspect of the production line, in a manner that allows various personnel to provide input that results in collective decisions affecting the manner in which the project is executed. Moreover, aspects of the invention permit updating rendered data in a manner that dynamically affects the operating parameters of devices on the production line.

In an aspect, a computer implemented system serves a dynamically synchronized instance to a network device. The system comprises a repository database storing at least one process model instance and a design tool processor coupled to the repository database and in communication through a network with a user device and a network device. The process model instance has a layout defined at least in part by a plurality of data elements, which include at least one plant model parameter relating to the state of a production line. The design tool processor is configured to provide the process model instance to the user device in response to a request for the process model instance received from the user device. Further, the user device modifies at least one of the data elements of the process model instance to generate a first process model instance (or "first version instance") and provides the first version instance to the design tool processor via the network. The first version instance includes a modified plant model parameter The design tool processor of the computer implemented system described herein is also configured, upon receiving the first version instance from the network, to generate a dynamically synchronized instance based on updating the data elements of the stored process model instance with the data elements of the first version instance, store the dynamically synchronized instance on the repository database, and serve the dynamically synchronized instance to the network device in response to a request. In this instance, the layout of the dynamically synchronized instance is based in part upon the updated data elements and the dynamically synchronized instance relates to the updated state of the production line.

In another aspect, a tangible processor-readable memory stores processor-executable instructions for serving a dynamically synchronized instance to a network device.

In yet another aspect, a computer-implemented method serves a dynamically synchronized instance to a network device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
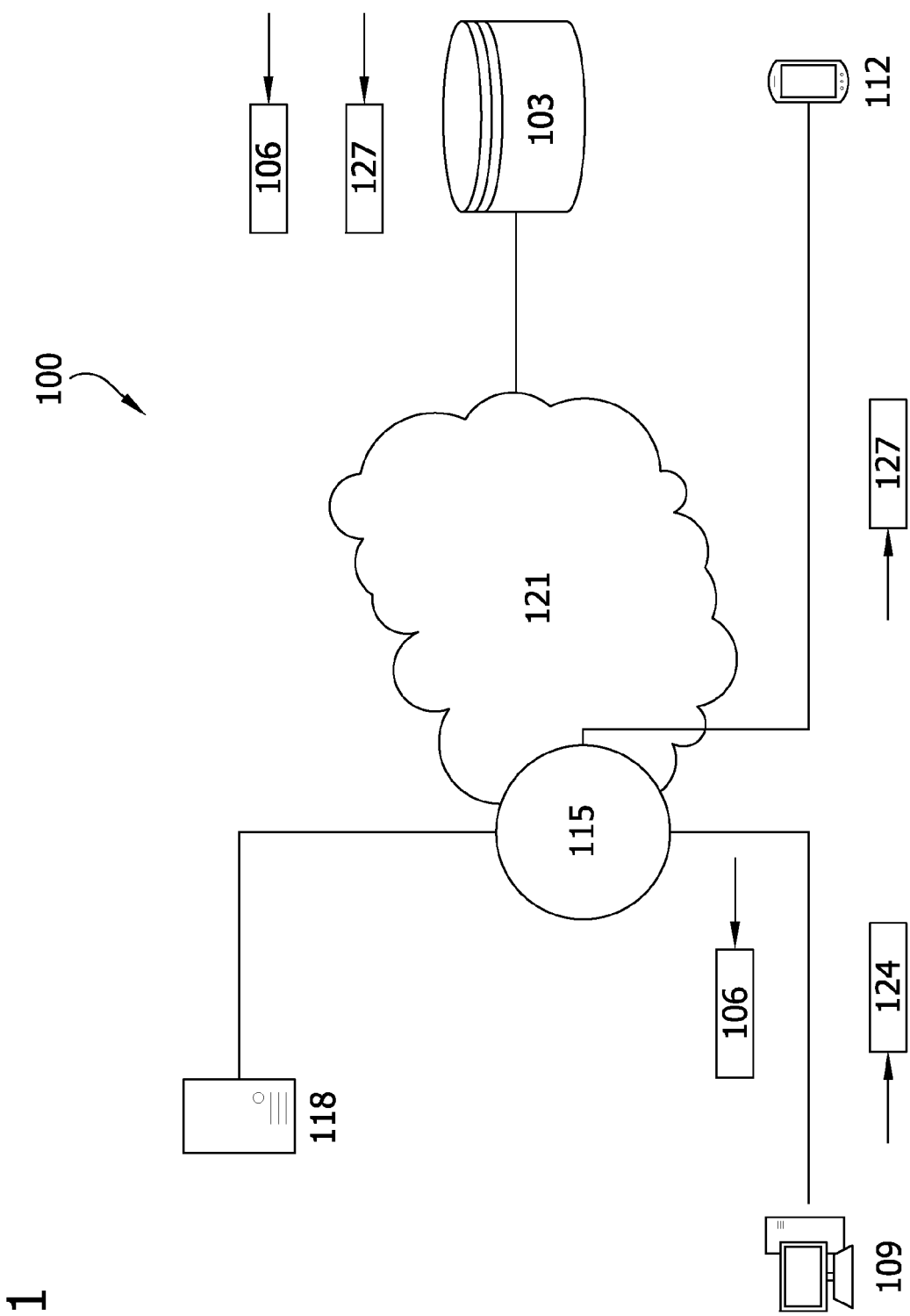
FIG. 1 depicts a system for serving a dynamically instance to a network device according to one embodiment of the present invention.

Referring now to the figures, FIG. 1 depicts a system for serving a dynamically synchronized instance to a network device according to one embodiment of the present invention. FIG. 1 includes a system 100 comprising a repository database 103. The repository database 103 stores at least one process model instance 106 and, in an embodiment, the process model instance 106 is provided to the repository database 103 by at least one of: a user device 109 and a network device 112, as will be further described herein. The user device 109 and the network device 112 each comprise at least one of an enterprise console and a mobile device in the illustrated embodiment.

Aspects of this invention relate to serving a dynamically synchronized instance defined by data elements that relate to process model execution. More specifically, aspects of the invention relate to providing the process model execution data to users in the form of a dynamically synchronized instance. Advantageously, a dynamic process model instance is provided that allows for users acting upon different points in a production line process to update the instance, and for the updates to affect the dynamically synchronized instance. In this manner, the instance is adaptable based on static and dynamic input conditions, and enables providing process execution-related data using sequentially synchronized versions of the instance. Furthermore, the versions are comprised of adaptable data elements that are themselves updateable in real time.

Each version requires various inputs to be considered before the version is rendered, and the device on which the version will be displayed is considered as an input, the version is capable of accommodating various devices and display sizes. This capability is advantageous given the increased prevalence of mobile devices in environments related to production lines and other forms of process execution. Additionally, aspects of the present invention provide for storing versions of a process model instance in a database, and for allowing access to a stored version of a process model instance. Access to previously stored versions allows for data related to an incomplete process to be made available in the manner that the data was presented to the instance and submitted to the database. Making data available in this manner allows for data provided to the process model instance to be used for other purposes. For example, the provided data is useful for the reconstruction of events of a production line process that result in particular outcomes, such as hazardous spills that require an escalation process as well as authentication confirming whether various actors have viewed data presented in a process model instance, or have changed (i.e. adapted) data elements comprising the process model instance.

The process model instance 106 includes a layout that is defined at least in part by a plurality of data elements. In an embodiment, the process model instance 106 comprises a generic template and the data elements are adaptable to result in updated versions of the process model instance 106 in the event that the data elements are adapted based on input, as will be described further herein. The data elements comprise data defining at least one of, for example, user input to the process model instance 106, user action on the process model instance 106, the current state of a process model, and device configuration input.

With further reference to FIG. 1, a design tool processor 115 is coupled to the repository database 103 and is in communication through a network 121 with a user device 109 and a network device 112. The design tool processor 115 is configured to retrieve the process model instance 106 from the repository database 103, and is configured to provide the process model instance 106 to the user device 109 in response to a request for the process model instance 106 received from the user device 109. In an embodiment, the design tool processor 115 further comprises a server 118.

The user device 109 receives the process model instance 106 provided from the design tool processor 115, and modifies at least one of the data elements of the process model instance 106 to generate a first version instance 124. In an embodiment, an updated version of process model instance 106 that results when the data elements of the process model instance 106 are adapted based on input comprises the first version instance 124. At least one of the data elements of the process model instance 106 are modified by the user device 109 based on user input received by the user device 109 to generate the first version instance 124. In another embodiment, at least one of the data elements of the process model instance 106 are modified by the user device 109 based on user action on the process model instance 106.

Still referring to FIG. 1, the design tool processor 115 is further configured, upon receiving a dynamically synchronized instance 127 from the user device 109 via the network 121, to serve the dynamically synchronized instance 127 to the network device 112. The design tool processor 115 generates dynamically synchronized instance 127 based upon updating the data elements of the process model instance 106 stored in the repository database 103 with the data elements of the first version instance 124 received from the user device 109. The design tool processor 115 also stores the dynamically synchronized instance 127 in the repository database 103 and serves it to the network device 112 in response to a request. In an embodiment, the request is received by the network device 112 and the determination to serve network device 112 with the dynamically synchronized instance 127 is based in part upon the updated data elements.

In a further embodiment, at least one of the data elements of the process model instance 106 are modified by the user device 109 based on the current state of a process model, which depends on, for example, the data contained in the dynamically synchronized instance 127 or external data.

Still referring to FIG. 1, at least one of the data elements of the process model instance 106 is modified by the user device 109 based on the current state of a process model. In an embodiment, the current state of a process model is dependent upon the data contained in the dynamically synchronized instance 127. In another embodiment, the current state of the process model is dependent upon external data.

Figure 2:
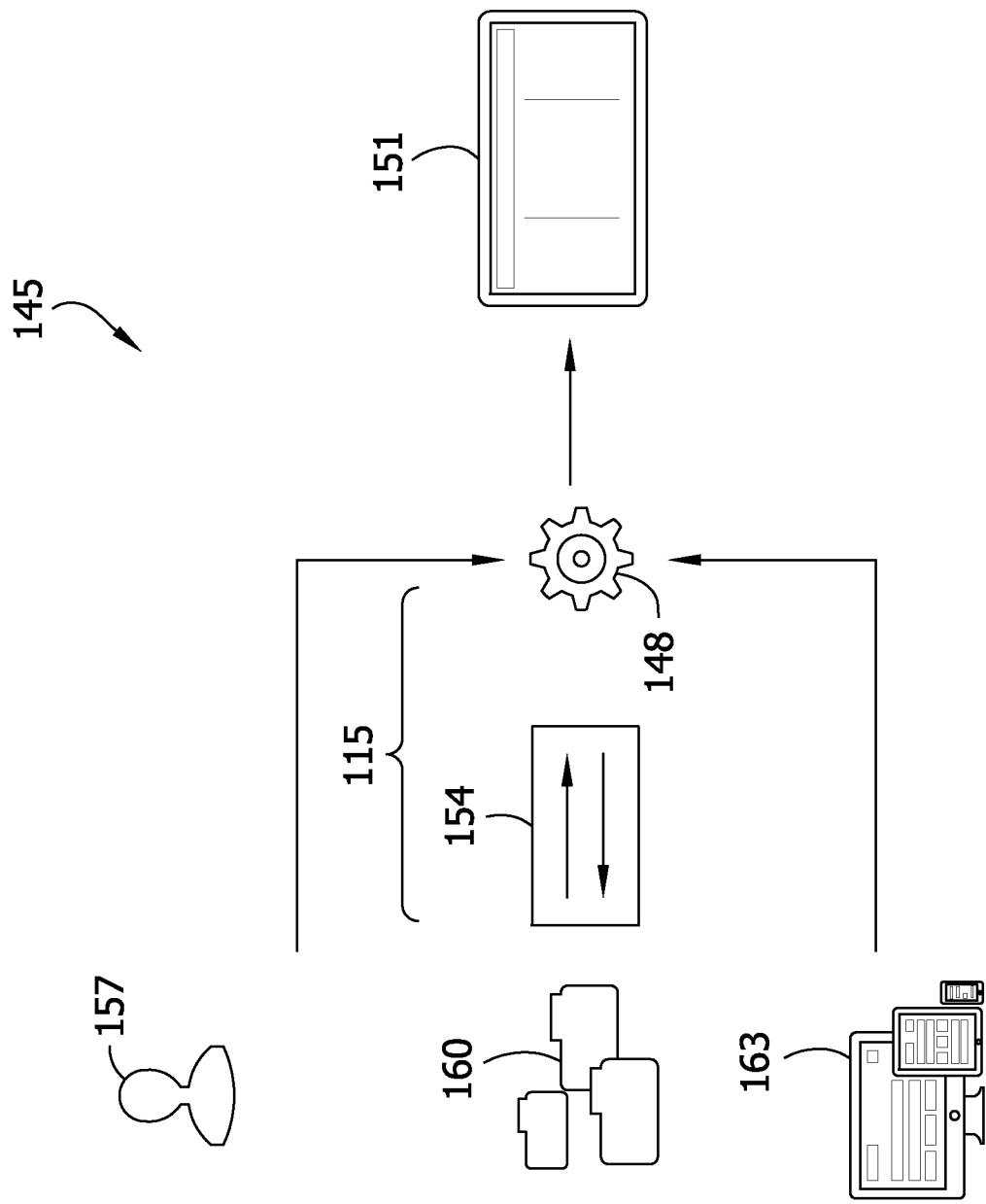
FIG. 2 depicts various inputs received by the design tool processor, and the effect of the inputs on generating a rendered output, according to one embodiment of the present invention.

FIG. 2 depicts various inputs received by the design tool processor, and the effect of the inputs on generating a rendered output, according to one embodiment of the present invention. The components in system 145, such as interface rendering engine 148, are described in FIG. 2 in terms of functional relationships between the components. Furthermore, FIG. 2 depicts the effect of the functional relationships, as well as the effect of various inputs, on generating a dynamically synchronized instance 127. In an embodiment, the dynamically synchronized instance 127 is presented as rendered output 151, for example as a rendered screen on a user interface, according to an aspect of the present invention.

As will be further described herein, in an embodiment, design tool processor 115 comprises interface rendering engine 148 and dynamic state interface engine 154. The interface rendering engine 148 receives data in the form of, for example, screen sequence input 157, which comprises data generated by a user. In an alternative embodiment, screen sequence input 157 comprises user input on a process model instance 106. Non limiting examples of user input on a process model instance are a user creating a process model instance 106, or a user viewing a process model instance 106, or a user adapting a process model instance 106 by adapting a data element comprising the process model instance 106.

In an embodiment, creating a process model instance 106 includes the availability of a drag-and-drop capable interface and a work area comprised of a canvas, allowing for a process model instance 106 to be designed by adding an item such as a data element to the work area. The process model instance 106 is added to the work area by dragging the data element from a toolbox to the canvas to facilitate the creation of a process model instance 106 with a complex layout. The canvas is configured to display the process model instance 106 in a manner consistent with a what you see is what you get (WYSIWYG) editor, providing an immediate preview of the appearance of the process model instance 106.

The drag-and-drop process model instance designer includes, for example, an advanced set of controls as data elements in the toolbox, and the designer uses layouts to organize the placement of controls on a process model instance 106 during creation of the instance. In general, controls are data elements designed with specific properties. Non limiting examples of controls include Boolean, Data Grid, Radio Button, and E-signature. Boolean is a control placed on the process model instance 106 that allows for a user to select "Yes or No". Data Grid is a control that allows for a data source provided to the process model instance 106 to be displayed in tabular form. Radio Button allows for the election of one of a group of mutually exclusive options display on a process model instance 106. E-signature is a control that allows for the authentication of the identity of a user, to confirm the integrity of the process model instance 106 in the state of the instance at the time the control was acted upon. In an embodiment, authentication is implemented as a control, and is optionally applicable to a process model instance 106. In another embodiment, authentication is automatically implemented upon each version of a process model instance 106. Authentication of a process model instance 106 results in the creation of a distinct instance, with the enhanced functionality of preventing the authenticated data from being accessed or changed absent implementing binary decryption techniques. In yet another embodiment, controls are customizable and support specific functionalities, such as jQuery and Knockout based JavaScript controls.

In another embodiment, screen sequence input 157 comprises user action on a process model instance 106. Such user action includes providing or updating aspects of various data elements that are presented to a user via the process model instance 106. By generating data as described above, incorporating user input and user action upon a process model instance 106 results in a user interface 109 providing a first version instance 124 that includes updated data elements 109 to interface rendering engine 148 of design tool processor 115. In part based on screen sequence input 157, interface rendering engine 148 is provided with data that populates data elements of a process model instance 106, resulting in a dynamically synchronized instance 127 presented as rendered output 151.

The dynamic state interface engine 154 advantageously provides updates to interface rendering engine 148 to update sequence state input 160 relating to creating or defining variables that control the sequence of a production line process, or data related to parameters that must be documented and managed to adequately execute a project using devices operating in a production line. In an embodiment, in part based on sequence state input 160 provided by dynamic state interface engine 154, interface rendering engine 148 is provided with data that populates data elements of a process model instance 106, resulting in a dynamically synchronized instance 127 presented as rendered output 151.

With further reference to FIG. 2, input is provided to interface rendering engine 148 in the form of sequence state input 160. In an embodiment, sequence state input 160 is provided using modeling software and sequence state input 160 defines the sequence of operation and the operating parameters of production line devices, which are automated to execute a planned project. The modeling software includes, for example, a component that is capable of routing sequence state input based on variables such as the status of the data. In one non limiting example, data status comprises data related to an escalation process that is initiated based on an event occurring on the production line. In an embodiment, the event occurring on the production line comprises a hazardous spill of chemicals.

In an embodiment, the component capable of routing sequence state input comprises dynamic state interface engine 154. Dynamic state interface engine 154 receives updates from interface rendering engine 148 to provide updates to the modeling software, such as updates to data elements stored in a repository database 103. The updates to data elements provided by interface rendering engine 148 and stored in a repository database 103 are related to, for example, executing aspects of a project using devices operating in a production line. Additionally or alternatively, the updates to data elements allow the generic template of the process model instance 106 to be adapted, and allow for the storage of a process model instance 106 in a repository database 103 as part of a sequence, resulting in reproducibility of the process model instance 106, as well as analysis of the data elements based on the manner in which the data elements as stored in the repository database 103. And subsequent sequential versions of process model instance 106 comprise at least a first version instance 124 and a dynamically instance 127, each of which are capable of being reproduced based on data related to the submission of the instance to the repository database 103. Subsequent sequential versions can be authenticated as described above.

With further reference to FIG. 2, in an embodiment, input is provided to interface rendering engine 148 in the form of device configuration input 163, which includes user interface (UI) data and user experience (UX) data. Non limiting examples of factors that are defined by user interface data include dynamic aspects of an interface such as suitability of the interface for the task at hand, controllability by a user over initiating and controlling the pace of the interaction, and suitability for supporting and guiding a user to learn to use the interface. Non limiting examples of factors that are defined by user experience data include data related to the overall experience delivered to users, such as the usability and findability of data. Usability is understood in the art to describe the extent to which a product enables relevant data to be used so that specified goals are effectively achieved. Findability is understood in the art to describe the extent to which users are capable of accessing the information without browsing, searching, or inquiring for guidance. In an embodiment, design tool processor 115 receives user interface data and user experience data as data inputs from a user device 109 or a network device 112 and provides a dynamically synchronized instance 127 presented as rendered output 151. In an embodiment, rendered output 151 is neutral to the device receiving the output from the design tool processor 115, and the adaptive layout generated by considering UI data and UX data advantageously provides a "native look and feel" regardless of the device that is used to create, update, or otherwise access a process model instance 106.

Figure 3:
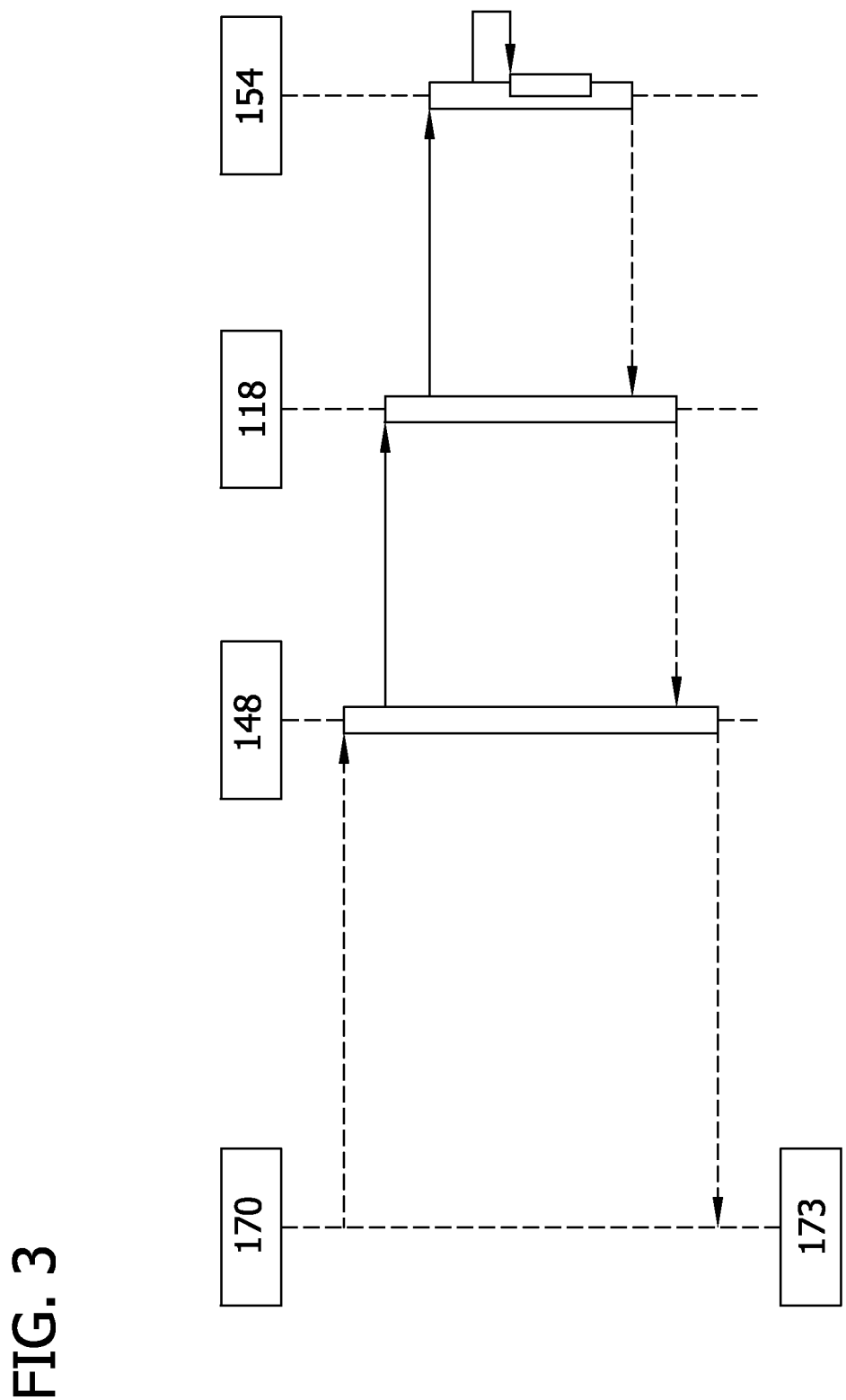
FIG. 3 depicts additional functionality related to design tool processor components according to one embodiment of the present invention.

FIG. 3 depicts additional functionality related to the design tool processor according to one embodiment of the present invention. As shown in FIG. 3, the design tool processor 115 comprises the interface rendering engine 148 and the dynamic state interface engine, and in combination, the engines allow for a dynamically synchronized instance 127 to be served to a network device 112. With reference to FIG. 3, a user provides input data 170 to an instance (e.g., process model instance 106). In an embodiment, input data 170 further comprises data based on user action upon user device 109. Alternatively, input data 170 is derived from the operation of network device 112. In an embodiment, the user providing input data 170 operates user device 109 and also receives output data 173 as rendered output 151. In another embodiment, the user providing input data 170 operates user device 109, and rendered output 151 is received as output data 173 at network device 112.

Input data 170 comprises data related to creating a process model instance 106 as described above. In an embodiment, input data 170 further comprises screen sequence input 157, sequence state input 160, and device configuration input 163, and input data 170 allows for input data 170 to be provided by different actors at different points in the execution of a project to affect process model instance 106 data elements based on adapting various data elements. In an embodiment, screen sequence input 157 comprises the activation of controls to adapt data elements.

In one non limiting example, an issue is presented to an operator at a production machine. The operator acts upon the process model instance 106 to raise the issue by operating user device 109 to provide input data 170 to adapt at least one element within process model instance 106. The input data 170 comprises, for example, a user electing one of a group of mutually exclusive options displayed on a process model instance 106. In an embodiment, input data 170 adapts an element relating to the functionality of a device operating at a point in the production process and/or adapts a parameter involved in the execution of a project.

The data element is adapted to result in a modified process model instance 106, comprising first version instance 124. Additionally or alternatively, adapted data elements result from further input provided by sequence state input 160 and device configuration input 163 and result in a modified process model instance 106, comprising a first version instance 124. First version instance 124 is configured to be passed to interface rendering engine 148. In an embodiment, server 118 retrieves data related to the first version instance 124 from the interface rendering engine 148, and sends the retrieved data to the dynamic state interface engine 154 as a request. In response to the request, dynamic state interface engine 154 determines parameters related to a dynamically synchronized instance 127 based on the adapted data elements. In an embodiment, sequence state input 160 is used to determine parameters related to the dynamically synchronized instance 127. In another embodiment, the parameters are determined independently of the dynamic state interface engine 154. Additionally or alternatively, the parameters are determined independently of the design tool processor 115 and the model driven software platform. In yet another embodiment, the dynamically synchronized instance 127 is external data generated independently of an application used by an industrial organization.

The determined parameters related to a dynamically synchronized instance 127 are passed between the dynamic state interface engine 154 and the server 118. In an embodiment, the determined parameters comprise a uniform resource locator (URL) made available to the server 118. The server 118 is configured to store the determined parameters in the repository database 103 to result in an updated process model instance 106 comprising a dynamically synchronized instance 127. The dynamically synchronized instance 127 is passed between the web server 118 and the interface rendering engine 148, and is further passed between the interface rendering engine 148 and rendered output 151 as output data 173.

To continue with the non limiting example described above, a supervisor of the operator receives rendered output 151 as dynamically synchronized instance 127. In an embodiment, rendered output 151 requires evaluating data comprising screen sequence input 157, sequence state input 160, and device configuration input 163 as described above. After rendered output 151 is provided to a supervisor, the supervisor is required to make determinations related to the issue raised by the operator, such as whether further investigation into the issue is necessary, or whether the issue should be presented directly to management personnel. The determinations can be reflected as the supervisor adapts data elements comprising the dynamically synchronized instance 127, and provides the instance to the interface rendering engine 148 to continue the process in a similar manner as described above.

In an embodiment, the supervisor adapts the data elements in a manner that results in the dynamically synchronized instance 127 being provided to a manager as rendered input 151. The input manager is required to escalate particular issues based on information provided by updated data elements. For example, a manager is required to evaluate the overall efficiency of a production process, or evaluate data that must necessarily be monitored to track the execution of a project. In the manner described above, determinations made by the manager are reflected as the supervisor adapts data elements presented by the dynamically synchronized instance 127, and provides the dynamically synchronized instance 127 to the interface rendering engine 148 to continue the process. By providing a dynamically synchronized instance 127 as a result of the various types of input described above, each actor is given the capability to update and provide input on the process being modeled. In an embodiment, the input of each actor is authenticated as described above to facilitate the reconstruction of events of a production line process that result in particular outcomes such as escalation processes. In another embodiment, the input of each actor is authenticated to confirm whether data elements have been viewed or adapted.

Figure 4:
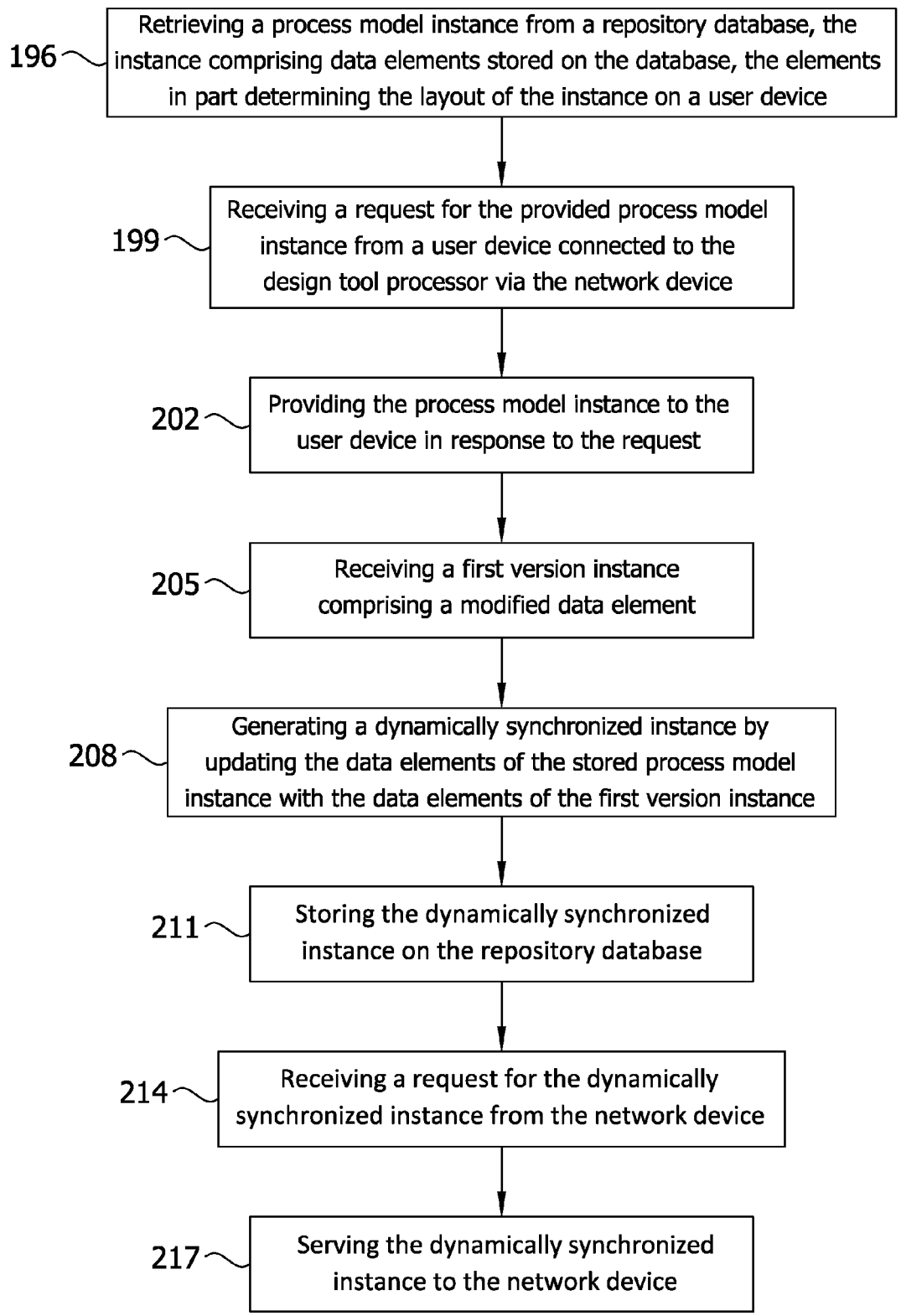
FIG. 4 depicts a method for serving a dynamically synchronized instance to a network device according to one embodiment of the present invention.

FIG. 4 depicts a method for serving a dynamically synchronized instance to a network device according to one embodiment of the present invention. The process begins at step 196 by retrieving process model instance 106 from the repository database 103. The design tool processor 115 coupled to repository database 103 and in communication through network 121 with user device 109 and network device 112 performs the retrieval. As described above, the process model instance 106 comprises data elements stored on the repository database 103, the data elements in part determining the layout of the process model instance 106 on the user device 109. At step 199, design tool processor 115 receives a request from the user device 109 connected to the design tool processor 115 via the network 118. At step 202, the design tool processor 115 provides the process model instance 106 to the user device 109 in response to the request.

The process continues at 205, where a first process model instance 124 is received, comprising an adapted data element. At 208, a dynamically synchronized instance 127 is generated based on updating the data elements of the stored process model instance 106 with the data elements of the first version instance 124. Step 211 comprises storing the dynamically synchronized instance 127 on the repository database 103. At step 214, a request for the dynamically synchronized instance 127 is received from the network device 112. Finally, the process concludes at step 217 with serving the dynamically synchronized instance 127 to the network device 112 in response to the request, wherein the layout of the dynamically synchronized instance 127 is based in part upon the updated data elements.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A computer implemented system for serving a dynamically synchronized instance to a network device, the system comprising:
   a repository database storing at least one process model instance, the process model instance having a layout defined at least in part by a plurality of data elements, the data elements including at least one plant model parameter that relates to the state of a production line; and
   a design tool processor coupled to the repository database and in communication through a network with a user device and a network device, the design tool processor configured to provide the process model instance to the user device in response to a first request for the process model instance received from the user device;
   wherein the user device modifies at least one of the data elements of the process model instance to generate a first version instance and provides the first version instance to the design tool processor via the network, the first version instance including a modified plant model parameter;
   wherein the design tool processor is further configured, upon receiving the first version model instance from the network, to execute processor-executable instructions for:
     generating a dynamically synchronized instance to update the state of the production line using the modified plant model parameter, the dynamically synchronized element having a layout based on updating the data elements of the stored process model instance with the data elements of the first version instance;
     storing the dynamically synchronized instance on the repository database; and
     serving the dynamically synchronized instance to the network device in response to a second request; and
   wherein the dynamically synchronized instance relates to the updated state of the production line.

2. The system of claim 1, wherein the data elements comprise at least one of the following: user input to the process model instance, user action on the process model instance, a current state of a process model, and device configuration input.

3. The system of claim 2, wherein the device to be served by the design tool processor is determined based at least in part on the updated data elements.

4. The system of claim 2, wherein the current state of a process model is dependent upon at least one of the following: the data contained in the dynamically synchronized instance and external data.

5. The system of claim 1, wherein the user device and the network device comprise at least one of: a mobile device and an enterprise console.

6. The system of claim 1, wherein the process model instance is provided to the repository database by at least one of: the user device and the network device.

7. The system of claim 1, wherein the plant model parameters relate to configuration activities for devices on the production line.

8. The system of claim 1, wherein the plant model parameters relate to a line class used in the production line, the line class comprising a Product Classes category defining a group of product classes and a line configuration category defining a group of functional classes ordered in sequence of execution.

9. The system of claim 8, wherein the line class relates to product packaging and wherein the line configuration category comprises at least one of the following: unscramble class, bottle washer class, filler class, cartoner class, and palletizer class.

10. A tangible processor-readable memory storing processor-executable instructions for serving a dynamically synchronized instance to a network device, said instructions comprising:
    a dynamic state interface engine for providing a process model instance via a network, the process model instance comprising data elements stored on a repository database, and having a layout defined at least in part by a plurality of data elements; and
    an interface rendering engine for receiving, via the dynamic state interface engine, the process model instance and for providing the process model instance to a network-connected user device separate from the network device, the interface rendering engine receiving a first version instance from the user device and provides the first version instance to the dynamic state interface engine, the first version instance comprising a modified data element of the process model instance;
    wherein the dynamic state interface engine generates a dynamically synchronized instance based on updating the data elements of the stored process model instance with the data elements of the received first version instance and stores the dynamically synchronized instance to the repository database; and
    wherein the interface rendering engine receives the dynamically synchronized instance and provides the dynamically synchronized instance to the network device, the data elements of the dynamically synchronized instance in part determining a layout of the dynamically synchronized instance on the user device.

11. The tangible processor-readable memory of claim 10, wherein the data elements comprise at least one of the following: user input to the process model instance, user action on the process model instance, a current state of a process model, and device configuration input.

12. The tangible processor-readable memory of claim 11, wherein the current state of a process model is dependent upon at least one of the following: the data contained in the dynamically synchronized instance and external data.

13. The tangible processor-readable memory of claim 10, wherein the dynamically synchronized instance is generated independently of an application used by an industrial organization.

14. The tangible processor-readable memory of claim 10, wherein the process model instance is provided to the repository database by at least one of: the user device and the network device.

15. A computer-implemented method for serving a dynamically synchronized instance to a network device using a design tool processor, wherein the method comprises
    retrieving, by a design tool processor coupled to a repository database and in communication through a network with a user device and a network device, a process model instance from the repository database, the process model instance comprising data elements stored on the repository database, the data elements in part determining a layout of the process model instance on the user device;

receiving a request for the provided process model instance, the request being received from the user device connected to the design tool processor via the network;

providing the process model instance to the user device in response to the request;

receiving a first process model instance comprising a modified data element;

generating a dynamically synchronized instance based on updating the data elements of the stored process model instance with the data elements of the first process model instance;

storing the dynamically synchronized instance on the repository database;

receiving a request for the dynamically synchronized instance from the network device; and, serving the dynamically synchronized instance to the network device in response to the request, wherein a layout of the dynamically synchronized instance is based in part upon the updated data elements.

16. The computer-implemented method of claim 15, wherein the data elements comprise at least one of the following: user input to the process model instance, user action on the process model instance, a current state of a process model, and device configuration input.

17. The computer-implemented method of claim 16, further comprising determining the network device served by the design tool processor based in part upon the updated data elements.

18. The computer-implemented method of claim 16, wherein the current state of a process model is dependent upon at least one of the following: the data contained in the dynamically synchronized instance and external data.

19. The computer-implemented method of claim 15, wherein generating a dynamically synchronized instance comprises generating the dynamically synchronized instance independently of an application used by an industrial organization.

20. The computer-implemented method of claim 15, further comprising providing the process model instance to the repository database by at least one of: the user device and the network device.

* * * * *